(12) United States Patent
Hou et al.

(10) Patent No.: US 11,671,692 B2
(45) Date of Patent: Jun. 6, 2023

(54) DISPLAY DEVICE INCLUDING LED CHIPS AROUND CAMERA LENS

(71) Applicant: Wuhan China Star Optoelectronics Technology Co., Ltd., Wuhan (CN)

(72) Inventors: Shaojun Hou, Wuhan (CN); Xindong Mei, Wuhan (CN); Chao Wang, Wuhan (CN); Guanghui Liu, Wuhan (CN); Zhifu Li, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 444 days.

(21) Appl. No.: 16/761,271

(22) PCT Filed: Apr. 3, 2020

(86) PCT No.: PCT/CN2020/083165
§ 371 (c)(1),
(2) Date: May 4, 2020

(87) PCT Pub. No.: WO2021/168993
PCT Pub. Date: Sep. 2, 2021

(65) Prior Publication Data
US 2022/0321747 A1  Oct. 6, 2022

(30) Foreign Application Priority Data
Feb. 26, 2020 (CN) .......................... 202010120007.2

(51) Int. Cl.
*H04N 23/57* (2023.01)
*G02F 1/1335* (2006.01)
(Continued)

(52) U.S. Cl.
CPC ....... *H04N 23/57* (2023.01); *G02F 1/133512* (2013.01); *G02F 1/133528* (2013.01);
(Continued)

(58) Field of Classification Search
CPC .. H04N 5/2257; H04N 5/2253; H04N 5/2254; H04N 23/57; H04N 23/54;
(Continued)

(56) References Cited

U.S. PATENT DOCUMENTS 9,057,931 B1 * 6/2015 Baldwin ................. G03B 17/48
10,754,455 B2 * 8/2020 Hwang ................. G06F 1/1686
(Continued)

FOREIGN PATENT DOCUMENTS

| CN | 106371187 | * 2/2017 |
| CN | 208737147 | 4/2019 |

(Continued)

*Primary Examiner* — Albert H Cutler
(74) *Attorney, Agent, or Firm* — PV IP PC; Wei Te Chung; Zhigang Ma

(57) ABSTRACT

The present invention discloses a display device including an optical film including a through hole; a display panel disposed on a surface of one side of the optical film, wherein the display panel includes a transparent area corresponding to the through hole; a camera including a camera lens, wherein the camera is inserted into the through hole and faces the transparent area; and a plurality of LED chips evenly arranged around the camera lens, wherein the LED chips are disposed in the through hole and between the camera and the transparent area.

8 Claims, 4 Drawing Sheets

(51) Int. Cl.
  *G02F 1/13357*  (2006.01)
  *G03B 13/34*    (2021.01)
  *H04N 23/54*    (2023.01)
  *H04N 23/55*    (2023.01)
  *G02F 1/1333*   (2006.01)
  *G03B 15/05*    (2021.01)
  *G03B 30/00*    (2021.01)

(52) U.S. Cl.
  CPC ............. *G03B 13/34* (2013.01); *H04N 23/54* (2023.01); *H04N 23/55* (2023.01)

(58) Field of Classification Search
  CPC ............... H04N 23/55; H04N 5/2256; G02F 1/133512; G02F 1/133528; G02F 1/1333; G02F 1/1336; G02F 1/1335; G03B 13/34; G03B 2215/0567; G03B 15/05; G03B 30/00
  See application file for complete search history.

(56) References Cited

U.S. PATENT DOCUMENTS

| | | | |
|---|---|---|---|
| 10,986,255 B2 * | 4/2021 | Evans, V | H04M 1/0264 |
| 2019/0158713 A1 | 5/2019 | McMillan et al. | |
| 2020/0050047 A1 | 2/2020 | Son et al. | |
| 2021/0051221 A1 * | 2/2021 | Sim | G02B 5/003 |
| 2022/0026771 A1 * | 1/2022 | Yan | G02F 1/136209 |

FOREIGN PATENT DOCUMENTS

| | | | |
|---|---|---|---|
| CN | 110231735 | | 9/2019 |
| CN | 110286521 | | 9/2019 |
| CN | 110456571 | * | 11/2019 |
| CN | 110974604 | | 2/2020 |

* cited by examiner

DISPLAY DEVICE INCLUDING LED CHIPS AROUND CAMERA LENS

RELATED APPLICATIONS

This application is a National Phase of PCT Patent Application No. PCT/CN2020/083165 having International filing date of Apr. 3, 2020, which claims the benefit of priority of Chinese Patent Application No. 202010120007.2 filed on Feb. 26, 2020. The contents of the above applications are all incorporated by reference as if fully set forth herein in their entirety.

FIELD AND BACKGROUND OF THE INVENTION

The present invention relates to a field of display, and particularly to a display device.

With the continuous development of display technology and people's pursuit of better display effects, in applications of terminal devices (such as mobile phones, pads, etc.), screens of high screen-to-body ratio have become the mainstream trend. However, because of lighting requirements of some functional devices such as cameras, light sensors, etc. in the terminal devices, the display screen is difficult to achieve the best screen-to-body ratio.

At present, in addition to narrowing the border, high screen-to-body ratios mainly use bangs screens, waterdrop screens, or hole punch screens, but each of them will sacrifice part of a screen space and a lighting device will be directly exposed on the screen. In the prior art, an under-screen camera solution is adopted, and a camera is generally disposed in a camera area at an edge or a corner of the screen. This area has no pixel unit or light source and cannot be used to display images, thus impacting the user experience. At present, there are also full screens that use solutions of a lift camera and a slide-lid on the market, but these solutions require an additional module structure or increase a thickness of the device, and the consumer experience is not particularly ideal. LCD is one of the mainstream display technologies in the current display market, and it is worth exploring and researching how to realize a true full-screen display of the LCD.

SUMMARY OF THE INVENTION

An object of the present invention is to solve the technical problem that the existing display device cannot display images due to the setting of the under-screen camera, resulting in a poor user experience.

In order to achieve the above object, the present invention provides a display device including: an optical film including a through hole; a display panel disposed on a surface of one side of the optical film, wherein the display panel includes a transparent area corresponding to the through hole; a camera including a camera lens, wherein the camera is inserted into the through hole and faces the transparent area; and a plurality of LED chips evenly arranged around the camera lens, wherein the LED chips are disposed in the through hole and between the camera and the transparent area.

Further, the display panel includes: an array substrate; a color filter substrate disposed opposite to the array substrate; a liquid crystal layer disposed between the array substrate and the color filter substrate; a first polarizer disposed on a surface of the array substrate away from the color filter substrate; and a second polarizer disposed on a surface of the color filter substrate away from the array substrate.

Further, the transparent area includes: a first transparent part located in the first polarizer; a second transparent part located in the array substrate; a third transparent part located in the liquid crystal layer; a fourth transparent part located in the color filter substrate; and a fifth transparent part located in the second polarizer, wherein the first transparent part, the second transparent part, the third transparent part, the fourth transparent part, and the fifth transparent part are arranged corresponding to each other.

Further, the display device further includes a light blocking film disposed on an inner sidewall of the through hole.

Further, the optical film includes: a first film; a second film disposed on a surface of one side of the first film; and a third film disposed on a surface of the second film away from the first film.

Further, the through hole includes: a first through hole penetrating the first film; a second through hole penetrating the second film; and a third through hole penetrating the third film, wherein the first through hole, the second through hole, and the third through hole are arranged corresponding to each other.

Further, the display device further includes a light guide element covers the LED chips.

Further, each of the LED chips is at least one of a red mini-LED, a green mini-LED, and a blue mini-LED.

Further, the camera includes: a flexible circuit board having an end connected to a connector; a photosensitive chip disposed on a surface of one side of the flexible circuit board; a filter element disposed on a surface of the photosensitive chip away from the flexible circuit board; a lens disposed on a side of the filter element away from the photosensitive chip; a support pillar attached to an inner sidewall of the through hole, surrounding the lens, and disposed on a surface of the flexible circuit board close to the lens; and a focus motor disposed in the support pillar, wherein the camera lens is disposed on a side of the lens away from the filter element and mounted to the support pillar; and the LED chips are mounted on a top of the support pillar.

Further, the LED chips are electrically connected to the flexible circuit board.

Technical effect of the present invention is that by setting the camera under the screen, the screen-to-body ratio of the display device can be further increased, wherein when the LED chips are powered off, the camera area is in a lighting state and can shoot normally, while when the LED chips are powered on, the camera area is in a display state, thereby increasing the area of the display area while improving the user's experience.

BRIEF DESCRIPTION OF THE SEVERAL VIEWS OF THE DRAWINGS

The technical solutions and other beneficial effects of the present application will be apparent through the detailed description of the specific implementation of the present application in conjunction with the accompanying drawings.

Figure 1:
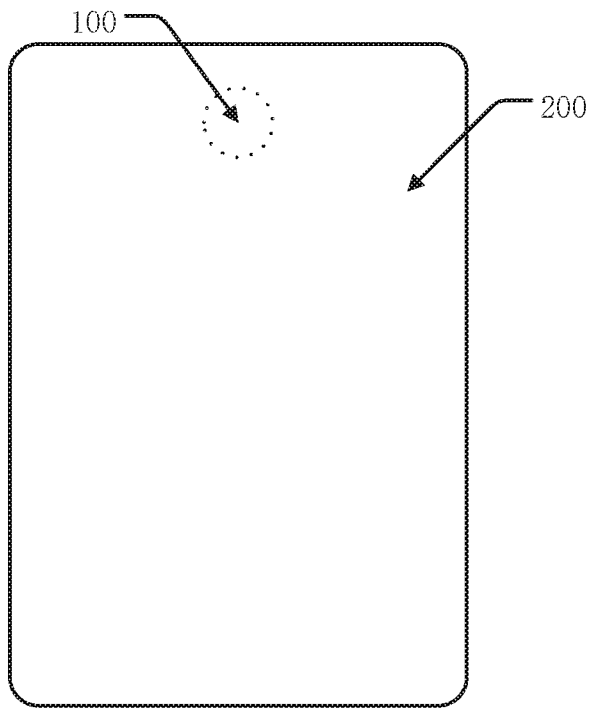
FIG. 1 is a state diagram when a camera area of a display device displays according to Embodiment 1 or 2 or 3 of the present invention.
Figure 2:
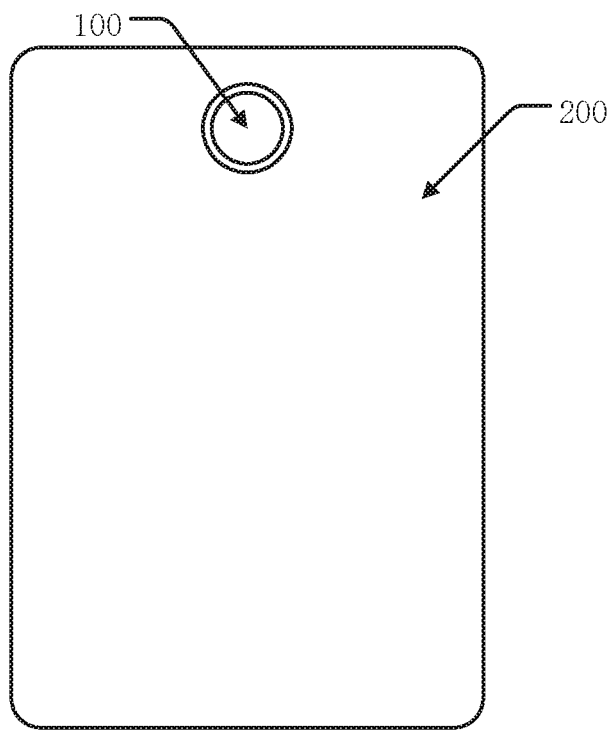
FIG. 2 is a state diagram when the camera area of a display device does not display according to Embodiment 1 or 2 or 3 of the present invention.

Elements in the drawings are designated by reference numerals listed below.

100, camera area; 200, display area;

11. camera; 12. light blocking film; 13. LED chip; 14. transparent area; 15. light guide element;

111, flexible circuit board; 112, connector; 113, photosensitive chip; 114, filter element; 115, lens; 116, support pillar; 117, focus motor; 118, camera lens;

131, red mini-LED; 132, green mini-LED; 133, blue mini-LED;

141, first transparent part; 142, second transparent part; 143, third transparent part; 144, fourth transparent part; 145, fifth transparent part;

20. through hole; 201, first through hole; 202, second through hole; 203, third through hole;

21, optical film; 22, display panel; 23, LED light bar;

211, first film; 212, second film; 213, third film;

221, first reflective sheet; 222, array substrate; 223, liquid crystal layer; 224, color filter substrate; 225, second reflective sheet.

DETAILED DESCRIPTION OF SPECIFIC EMBODIMENTS OF THE INVENTION

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the description of this application, it should be understood that the terms "center", "longitudinal", "transverse", "length", "width", "thickness", "upper", "lower", "front", "Rear", "left", "right", "vertical", "horizontal", "top", "bottom", "inside", "outside", "clockwise", "counterclockwise", and the like are based on the orientation or positional relationship shown in the drawings, and is merely for the convenience of describing the present invention and simplifying the description, rather than indicating or implying that the device or element referred to must have a specific orientation, structure and operation in a specific orientation, which should not be construed as limitations on the present invention. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features.

In the description of the present application, the meaning of "a plurality" is two or more, unless specifically defined otherwise.

In the description of this application, it should be noted that the terms "installation", "connected", and "connected" should be understood in a broad sense unless explicitly stated and limited otherwise. For example, it can be a fixed connection, a detachable connection, or an integral connection; it can also be a mechanical connection or an electrical connection; it can be a direct connection; or it can be an indirect connection through an intermediate medium; or it can be a communication between two components.

In the present invention, unless otherwise expressly stated and limited, the formation of a first feature over or under a second feature in the description that follows may include embodiments in which the first and second features are formed in direct contact, and may also include embodiments in which additional features may be formed between the first and second features, such that the first and second features may not be in direct contact. Moreover, the first feature "above", "over" and "on" the second feature includes the first feature directly above and above the second feature, or merely indicating that the first feature is at a level higher than the second feature. The first feature "below", "under" and "beneath" the second feature includes the first feature directly below and obliquely below the second feature, or merely the first feature has a level lower than the second feature.

The following disclosure provides many different embodiments or examples for implementing different structures of the present invention. In order to simplify the disclosure of the present invention, the components and arrangements of the specific examples are described below. Of course, they are merely examples and are not intended to limit the present invention. In addition, the present invention may repeat reference numerals and/or reference letters in the various embodiments, which are for the purpose of simplicity and clarity, and do not indicate the relationship between the various embodiments and/or arrangements discussed. Moreover, the present invention provides examples of various specific processes and materials, but one of ordinary skill in the art will recognize the use of other processes and/or the use of other materials.

Embodiment 1

Specifically, please refer to FIGS. 1 to 6. This embodiment provides a display device including an camera area 100 and a display area 200. The camera area 100 includes a camera 11, a light blocking film 12, LED chips 13, and a transparent area 14. The display area 200 includes an optical film 21, a display panel 22 and an LED light bar 23.

Figure 3:
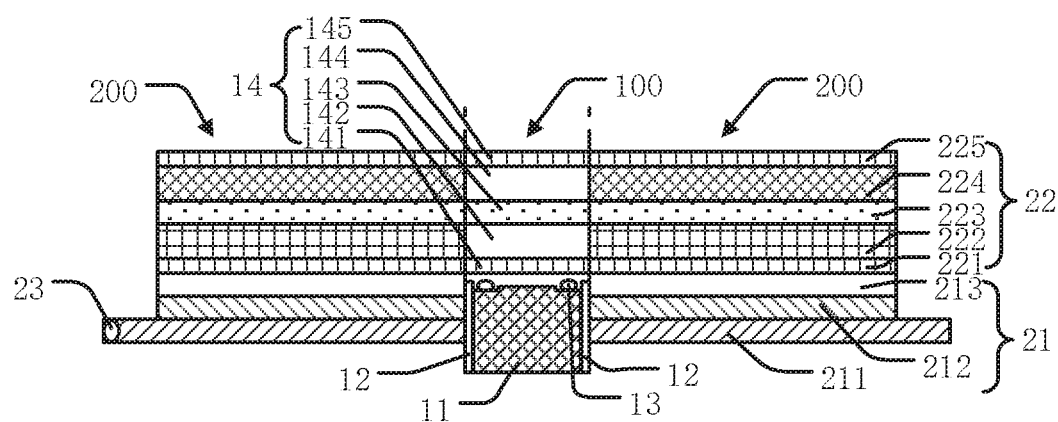
FIG. 3 is a schematic structural diagram of a display device according to Embodiment 1 of the present invention.

As shown in FIG. 3, the optical film 21 includes a first film 211, a second film 212, and a third film 213 to realize the reflection, guidance, and diffusion of light.

The first film 211 is a reflective sheet, which plays a reflective role to reflect all the light exiting from the LED light bar 23, and then the light exits therefrom, thereby preventing the light from being transmitted downward and improving the utilization of light.

The second film 212 is provided on an upper surface of the first film 211, and is a light guide plate, which plays a role in guiding light. In this embodiment, the backlight module of the display device is an edge-lit backlight module, so the LED light bar 23 is located on a side of the optical film 21. After the light exits from the LED light bar 23, it enters the second film 212, that is, the light guide plate, and then most of the light exits upward. Even if a small part of the light exits from below the light guide plate, the light will also be reflected upward by the reflective sheet located under the light guide plate. There is also a small amount of light incident on the side of the light guide plate opposite to the light incident side, and because this side is provided with a light blocking film 12, the light will not further penetrate into the camera area 100, which improves a light exit rate to a certain extent.

The third film 213 is disposed on an upper surface of the second film 212. The third film 213 is a diffusion sheet, so that the incident light is uniformly diffused and then exit.

Figure 4:
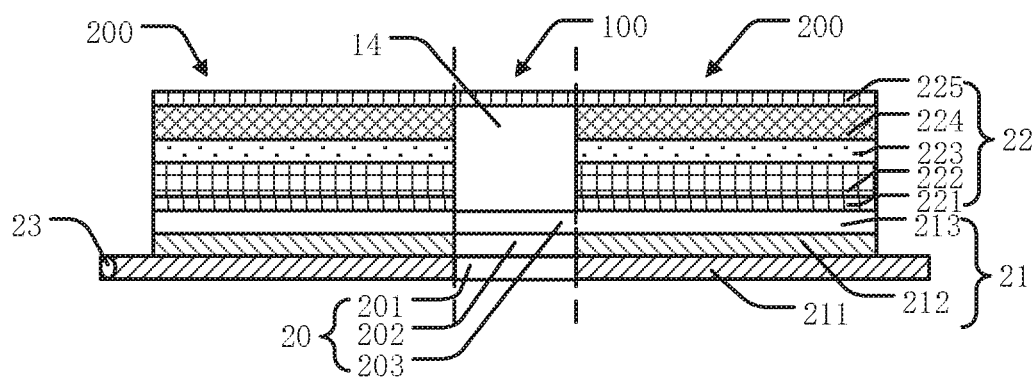
FIG. 4 is a schematic diagram of the display device without a camera according to Embodiment 1 or 2 or 3 of the present invention.

As shown in FIG. 4, a through hole 20 is provided in the optical film 12 for placing a component such as the camera, etc. A first through hole 201 penetrates the first film 211, a second through hole 202 penetrates the second film 212, and a third through hole 203 penetrates the third film 213. The first through hole 201, the second through hole 202, and the third through holes 203 correspond to each other and communicate with each other. Preferably, an inner diameter of the first through hole 201, an inner diameter of the second through hole 202, and an inner diameter of the third through hole 203 are equal, so that the camera area 100 and the display area 200 are more easily adhered closely to each other.

The display panel 22 includes a first polarizer 221, an array substrate 222, a liquid crystal layer 223, a color filter substrate 224, and a second polarizer 225. The display panel 22 realizes a display function.

The first polarizer 221 is provided on an upper surface of the third film 213 and functions to polarize light. The array substrate 222 is disposed on an upper surface of the first polarizer 221 to serve as a circuit switch of the display device. The color filter substrate 224 is disposed above the array substrate 222 and opposite to the array substrate 222. The color filter substrate 224 includes RGB color resists, a black matrix, a spacer, a cover plate, and the like. The liquid crystal layer 223 is provided between the array substrate 222 and the color filter substrate 224. The second polarizer 225 is provided on an upper surface of the color filter substrate 224 and functions to polarize light.

The transparent area 14 penetrates the display panel 22 and is disposed corresponding to the through hole. The transparent area 14 includes a first transparent part 141, a second transparent part 142, a third transparent part 143, a fourth transparent part 144, and a fifth transparent part 145. The first transparent part 141 penetrates the first polarizer 221. The first transparent part 141 still has a function of polarizing light, but it is made of a transparent material, which is convenient for light to pass through. The second transparent part 142 penetrates through the array substrate 222. The second transparent part 142 still has a function of controlling the circuit switch, but it is made of a transparent material, which is convenient for light to pass through. The third transparent part 143 penetrates through the liquid crystal layer 223. The third transparent part 143 still has a function of driving liquid crystal, but it is light-transmissive to facilitate light to pass through. The fourth transparent part 144 penetrates through the color filter substrate 224. The fourth transparent part 144 is still provided with RGB color resists, a black matrix, an spacer, a cover plate, etc., which can realize the light filtering function, and made of a material of extremely transparent, which is convenient for light to pass through. The fifth transparent part 145 penetrates through the second polarizer 225. The fifth transparent part 145 still has a function of polarizing light, but it is made of a transparent material to facilitate light to pass through.

Figure 6:
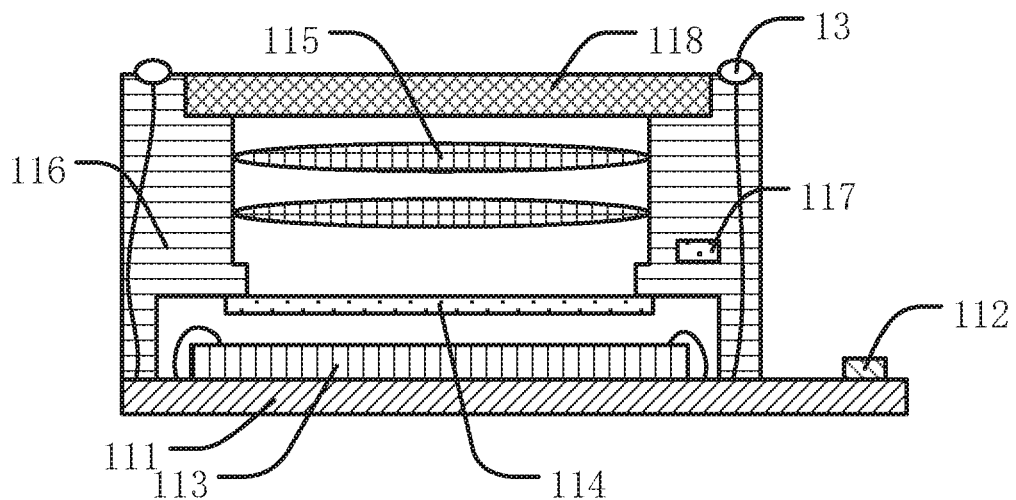
FIG. 6 is a schematic structural diagram of a camera according to Embodiment 1 or 2 or 3 of the present invention.

The camera 11 is disposed in the through hole. As shown in FIG. 6, the camera 11 includes a flexible circuit board 111, a connector 112, a photosensitive chip 113, a filter element 114, a lens 115, a support pillar 116, a focus motor 117, and a camera lens 118.

The connector 112 is provided at one end of the flexible circuit board 111 and configured to transmit image data received by the flexible circuit board 111 to the outside.

The photosensitive chip 113 is provided on an upper surface of the flexible circuit board 111, and has a CCD or CMOS structure, configured to convert an optical signal transmitted from the lens 115 into an electrical signal, and process the electrical signal to obtain corresponding image data. Alternatively, the obtained corresponding image data can be further processed with the image data received by the flexible circuit board 111 and then transmitted to the outside through the connector 112.

The filter element 114 is disposed above the photosensitive chip 113 and is configured to filter excess infrared light and ultraviolet light.

The lens 115 is disposed above the filter element 114 for collecting and concentrating light, and may be composed of two or more plastic lenses or glass lenses.

The support pillar 116 is attached to an inner side wall of the through hole to play a supporting role. The support pillar 116 is provided on an upper surface of the flexible circuit board 111 and has a ring shape at the edge.

The focus motor 117 is disposed in the support pillar 116 and configured to adjust the position of the lens 115 to obtain a clear image, that is, focusing function.

The camera lens 118 is disposed above the lens 115 and is mounted to the support pillar 116 to protect the lens 115.

Figure 5:
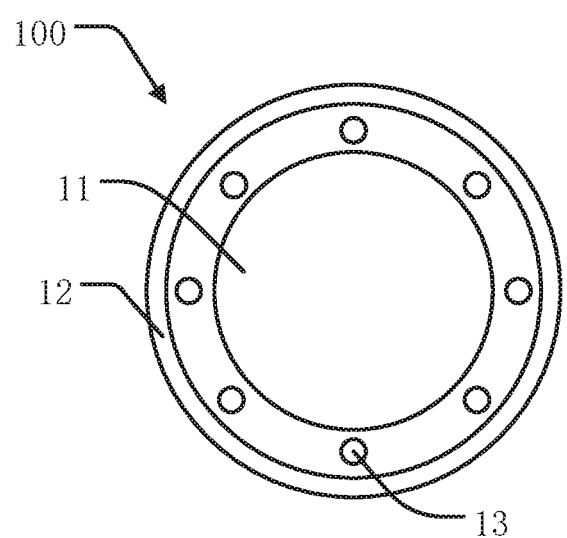
FIG. 5 is a top view of a camera area according to Embodiment 1 of the present invention.

The light blocking film 12 is attached to an inner side wall of the through hole, and is disposed between the support pillar 116 and the optical film 21, so as to block or reflect light and prevent the light emitted from the LED light bar 23 from entering the camera 11. A light blocking coating or component can be disposed by attaching, spray-coating, screen printing, etc., or a light blocking iron frame can also be placed, which all can achieve the light blocking effect. A top view of the camera area 100 is shown in FIG. 5.

The LED chips 13 are mounted on an upper surface of the support pillar 116. Because the support pillar 116 is a ring-shaped support pillar, the LED chips 13 also surround the lens 118 and are evenly distributed on the support pillar 116. The LED chips 13 can also be connected to a related control element such as the flexible circuit board 111 or the photosensitive element 113 through a lead, to realize the synchronous control of the LED chips 13 and the camera 11, that is, when the camera 11 is working, the LED chips 13 can be controlled to be powered off to realize the camera function; while when the camera 11 is turned off, the LED chip 13 can be controlled to be powered and start working, so that the camera area 100 can display normally, and a full screen is realized.

When the LED chip 13 is powered on, the camera area 100 is turned on to be in a backlight mode. At this time, a lighting device such as the photosensitive chip 113, etc. is in a non-operating state, that is, no lighting, and because the transparent area 14 of the camera area 100 is still provided with related devices such as the array substrate, the color filter substrate, and the liquid crystal layer, the function of light-emitting display can be realized, and the camera area 100 can display normally while the display area 200 is the normal display state, that is, a full-screen effect is achieved (referring to FIG. 1).

When the LED chip 13 is powered off, the camera area 100 turns off the backlight mode. At this time, a lighting device such as the photosensitive chip 113, etc. is in a working state, that is, starts lighting. Liquid crystals (i.e., the third transparent part 143) corresponding to the camera area 100 are driven and adjusted to be fully transferred into a high-transmittance state by the LCD. With the high-transmittance design of the second transparent part 142 and the fourth transparent part 144, external light can enter the camera 11 corresponding to and under the camera area 100 through the display panel 22 to realize the lighting function. At this time, the display area 200 still normally displays. Since a light blocking film 12 is disposed between the camera 11 and the edge-lit optical film 21, the backlight of the display area 200 will not impact the normal lighting of the camera 11, and the camera 11 can work normally (referring to FIG. 2).

Technical effect of the display device described in this embodiment is that by setting the camera under the screen, the screen-to-body ratio of the display device can be further increased, wherein when the LED chips are powered off, the camera area is in a lighting state and can shoot normally, while when the LED chips are powered on, the camera area is in a display state, thereby increasing the area of the display area, while improving the user's experience.

Embodiment 2

Figure 7:
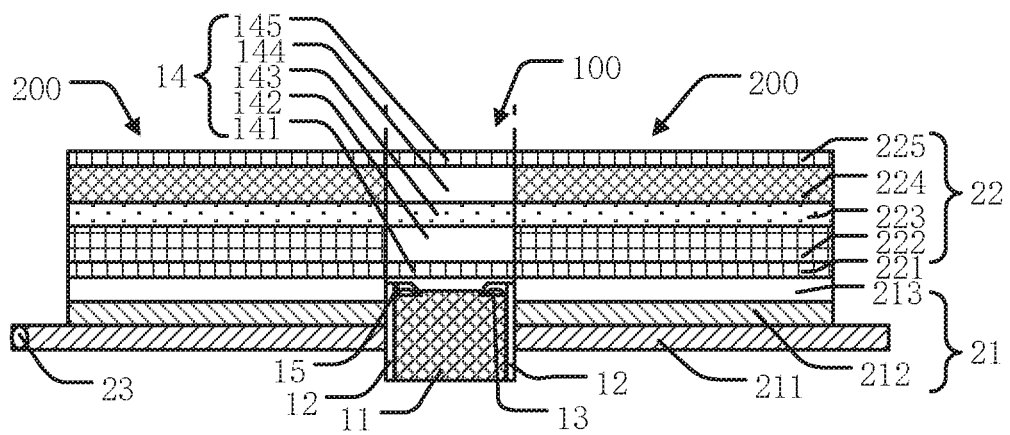
FIG. 7 is a schematic structural diagram of a display device according to Embodiment 2 of the present invention.

Specifically, referring to FIG. 7, this embodiment provides a display device including an camera area 100 and a display area 200. The camera area 100 includes a camera 11, a light blocking film 12, LED chips 13, a transparent area 14 and a light guide element 15. The display area 200 includes an optical film 21, a display panel 22 and an LED light bar 23.

The optical film 21 includes a first film 211, a second film 212, and a third film 213 to realize the reflection, guidance, and diffusion of light.

The first film 211 is a reflective sheet, which plays a reflective role to reflect all the light exiting from the LED light bar 23, and then the light exits therefrom, thereby preventing the light from being transmitted downward and improving the utilization of light.

The second film 212 is provided on an upper surface of the first film 211, and is a light guide plate, which plays a role in guiding light. In this embodiment, the backlight module of the display device is an edge-lit backlight module, so the LED light bar 23 is located on a side of the optical film 21. After the light exits from the LED light bar 23, it enters the second film 212, that is, the light guide plate, and then most of the light exits upward. Even if a small part of the light exits from below the light guide plate, the light will also be reflected upward by the reflective sheet located under the light guide plate. There is also a small amount of light incident on the side of the light guide plate opposite to the light incident side, and because this side is provided with a light blocking film 12, the light will not further penetrate into the camera area 100, which improves a light exit rate to a certain extent.

The third film 213 is disposed on an upper surface of the second film 212. The third film 213 is a diffusion sheet, so that the incident light is uniformly diffused and then exit.

As shown in FIG. 4, a through hole 20 is provided in the optical film 12 for placing a component such as the camera, etc. A first through hole 201 penetrates the first film 211, a second through hole 202 penetrates the second film 212, and a third through hole 203 penetrates the third film 213. The first through hole 201, the second through hole 202, and the third through holes 203 correspond to each other and communicate with each other. Preferably, an inner diameter of the first through hole 201, an inner diameter of the second through hole 202, and an inner diameter of the third through hole 203 are equal, so that the camera area 100 and the display area 200 are more easily adhered closely to each other.

The display panel 22 includes a first polarizer 221, an array substrate 222, a liquid crystal layer 223, a color filter substrate 224, and a second polarizer 225. The display panel 22 realizes a display function.

The first polarizer 221 is provided on an upper surface of the third film 213 and functions to polarize light. The array substrate 222 is disposed on an upper surface of the first polarizer 221 to serve as a circuit switch of the display device. The color filter substrate 224 is disposed above the array substrate 222 and opposite to the array substrate 222. The color filter substrate 224 includes RGB color resists, a black matrix, a spacer, a cover plate, and the like. The liquid crystal layer 223 is provided between the array substrate 222 and the color filter substrate 224. The second polarizer 225 is provided on an upper surface of the color filter substrate 224 and functions to polarize light.

The transparent area 14 penetrates the display panel 22 and is disposed corresponding to the through hole. The transparent area 14 includes a first transparent part 141, a second transparent part 142, a third transparent part 143, a fourth transparent part 144, and a fifth transparent part 145. The first transparent part 141 penetrates the first polarizer 221. The first transparent part 141 still has a function of polarizing light, but it is made of a transparent material, which is convenient for light to pass through. The second transparent part 142 penetrates through the array substrate 222. The second transparent part 142 still has a function of controlling the circuit switch, but it is made of a transparent material, which is convenient for light to pass through. The third transparent part 143 penetrates through the liquid crystal layer 223. The third transparent part 143 still has a function of driving liquid crystal, but it is light-transmissive to facilitate light to pass through. The fourth transparent part 144 penetrates through the color filter substrate 224. The fourth transparent part 144 is still provided with RGB color resists, a black matrix, an spacer, a cover plate, etc., which can realize the light filtering function, and made of a material of extremely transparent, which is convenient for light to pass through. The fifth transparent part 145 penetrates through the second polarizer 225. The fifth transparent part 145 still has a function of polarizing light, but it is made of a transparent material to facilitate light to pass through.

The camera 11 is disposed in the through hole. As shown in FIG. 6, the camera 11 includes a flexible circuit board 111, a connector 112, a photosensitive chip 113, a filter element 114, a lens 115, a support pillar 116, a focus motor 117, and a camera lens 118.

The connector 112 is provided at one end of the flexible circuit board 111 and configured to transmit image data received by the flexible circuit board 111 to the outside.

The photosensitive chip 113 is provided on an upper surface of the flexible circuit board 111, and has a CCD or CMOS structure, configured to convert an optical signal transmitted from the lens 115 into an electrical signal, and process the electrical signal to obtain corresponding image data. Alternatively, the obtained corresponding image data can be further processed with the image data received by the flexible circuit board 111 and then transmitted to the outside through the connector 112.

The filter element 114 is disposed above the photosensitive chip 113 and is configured to filter excess infrared light and ultraviolet light.

The lens 115 is disposed above the filter element 114 for collecting and concentrating light, and may be composed of two or more plastic lenses or glass lenses.

The support pillar 116 is attached to an inner side wall of the through hole to play a supporting role. The support pillar 116 is provided on an upper surface of the flexible circuit board 111 and has a ring shape at the edge.

The focus motor 117 is disposed in the support pillar 116 and configured to adjust the position of the lens 115 to obtain a clear image, that is, focusing function.

The camera lens 118 is disposed above the lens 115 and is mounted to the support pillar 116 to protect the lens 115.

Figure 8:
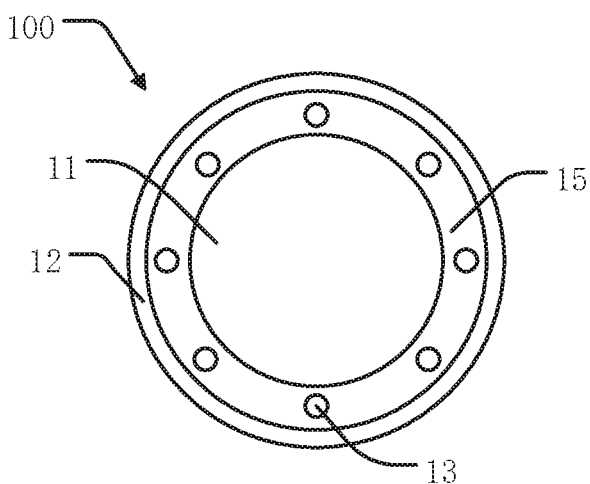
FIG. 8 is a top view of the camera area according to Embodiment 2 of the present invention.

The light blocking film 12 is attached to an inner side wall of the through hole, and is disposed between the support pillar 116 and the optical film 21, so as to block or reflect light and prevent the light emitted from the LED light bar 23 from entering the camera 11. A light blocking coating or component can be disposed by attaching, spray-coating, screen printing, etc., or a light blocking iron frame can also be placed, which all can achieve the light blocking effect. A top view of the camera area 100 is shown in FIG. 8.

The LED chips 13 are mounted on an upper surface of the support pillar 116. Because the support pillar 116 is a ring-shaped support pillar, the LED chips 13 also surround the lens 118 and are evenly distributed on the support pillar 116. The brightness of the LED chips 13 can be individually adjusted. Also, the LED chips 13 can also be connected to a related control element such as the flexible circuit board 111 or the photosensitive element 113 through a lead, to realize the synchronous control of the LED chips 13 and the camera 11, that is, when the camera 11 is working, the LED chips 13 can be controlled to be powered off to realize the camera function; while when the camera 11 is turned off, the LED chip 13 can be controlled to be powered and start working, so that the camera area 100 can display normally, and a full screen is realized.

The light guide element 15 covers the LED chips 13, the light guide element 15 is transparent, and the transparency is as high as 90% to 100%. The light guide element 15 may be an optical sheet, an optical film, or diffusion particles, etc., such that the light of the LED chips 13 around the camera 11 can be uniformly incident below the camera area 100, and the difference in backlight between the camera area 100 and the display area 200 can be reduced.

When the LED chip 13 is powered on, the camera area 100 is turned on to be in a backlight mode. At this time, a lighting device such as the photosensitive chip 113, etc. is in a non-operating state, that is, no lighting, and because the transparent area 14 of the camera area 100 is still provided with related devices such as the array substrate, the color filter substrate, and the liquid crystal layer, the function of light-emitting display can be realized, and the camera area 100 can display normally while the display area 200 is the normal display state, that is, a full-screen effect is achieved (referring to FIG. 1).

When the LED chip 13 is powered off, the camera area 100 turns off the backlight mode. At this time, a lighting device such as the photosensitive chip 113 etc. is in a working state, At this time, a lighting device such as the photosensitive chip 113, etc. is in a working state, that is, starts lighting. Liquid crystals (i.e., the third transparent part 143) corresponding to the camera area 100 are driven and adjusted to be fully transferred into a high-transmittance state by the LCD. With the high-transmittance design of the second transparent part 142 and the fourth transparent part 144, external light can enter the camera 11 corresponding to and under the camera area 100 through the display panel 22 to realize the lighting function. At this time, the display area 200 still normally displays. Since a light blocking film 12 is disposed between the camera 11 and the edge-lit optical film 21, the backlight of the display area 200 will not impact the normal lighting of the camera 11, and the camera 11 can work normally (referring to FIG. 2).

Technical effect of the display device described in this embodiment is that by setting the camera under the screen, the screen-to-body ratio of the display device can be further increased, wherein when the LED chips are powered off, the camera area is in a lighting state and can shoot normally, while when the LED chips are powered on, the camera area is in a display state, thereby increasing the area of the display area, while improving the user's experience. The addition of a layer of the light guide element enables the light of the LED chips 13 around the camera to be uniformly incident below the camera area 100, and reduces the difference in backlight between the camera area and the display area, further improving the display effect of the display device.

Embodiment 3

Figure 9:
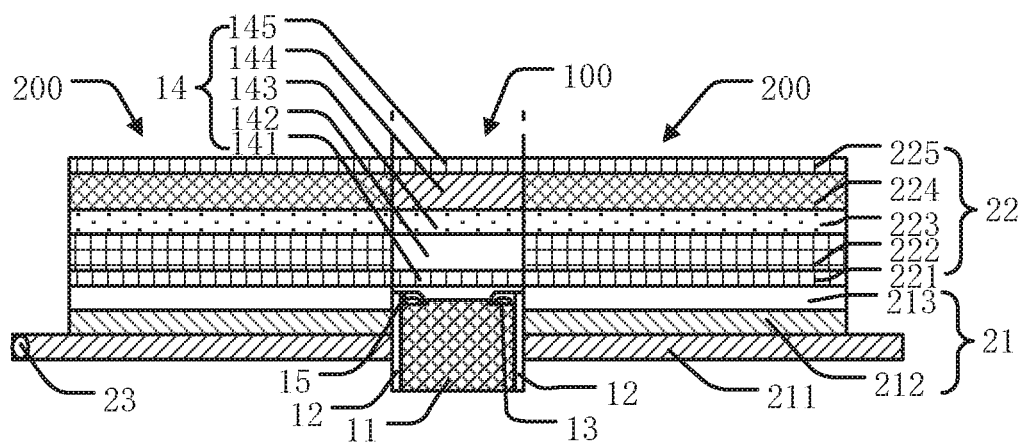
FIG. 9 is a schematic structural diagram of a display device according to Embodiment 3 of the present invention.
Figure 10:
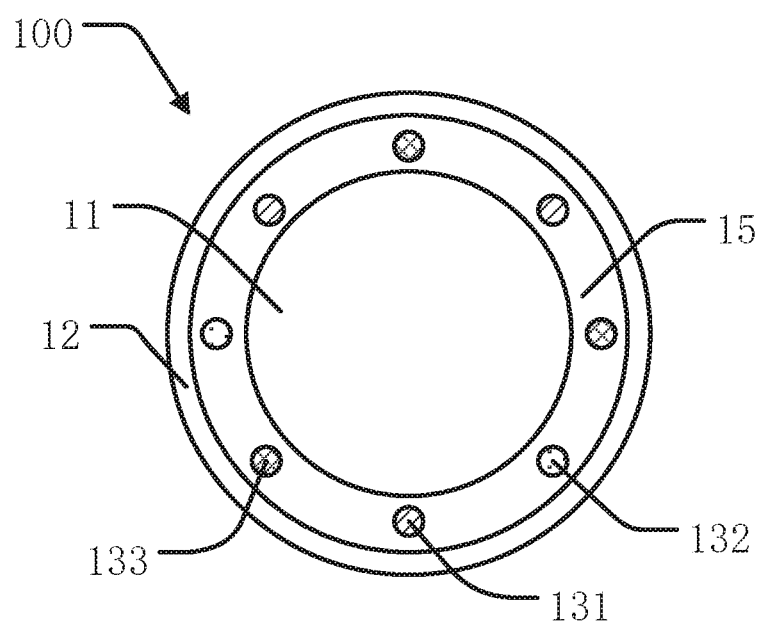
FIG. 10 is a top view of the camera area according to Embodiment 3 of the present invention.

Specifically, referring to FIG. 9, this embodiment provides a display device including an camera area 100 and a display area 200. The camera area 100 includes a camera 11, a light blocking film 12, LED chips 13, a transparent area 14 and a light guide element 15. The display area 200 includes an optical film 21, a display panel 22 and an LED light bar 23.

The optical film 21 includes a first film 211, a second film 212, and a third film 213 to realize the reflection, guidance, and diffusion of light.

The first film 211 is a reflective sheet, which plays a reflective role to reflect all the light exiting from the LED light bar 23, and then the light exits therefrom, thereby preventing the light from being transmitted downward and improving the utilization of light.

The second film 212 is provided on an upper surface of the first film 211, and is a light guide plate, which plays a role in guiding light. In this embodiment, the backlight module of the display device is an edge-lit backlight module, so the LED light bar 23 is located on a side of the optical film 21. After the light exits from the LED light bar 23, it enters the second film 212, that is, the light guide plate, and then most of the light exits upward. Even if a small part of the light exits from below the light guide plate, the light will also be reflected upward by the reflective sheet located under the light guide plate. There is also a small amount of light incident on the side of the light guide plate opposite to the light incident side, and because this side is provided with a light blocking film 12, the light will not further penetrate into the camera area 100, which improves a light exit rate to a certain extent.

The third film 213 is disposed on an upper surface of the second film 212. The third film 213 is a diffusion sheet, so that the incident light is uniformly diffused and then exit.

As shown in FIG. 4, a through hole 20 is provided in the optical film 12 for placing a component such as the camera, etc. A first through hole 201 penetrates the first film 211, a second through hole 202 penetrates the second film 212, and a third through hole 203 penetrates the third film 213. The first through hole 201, the second through hole 202, and the third through holes 203 correspond to each other and communicate with each other. Preferably, an inner diameter of the first through hole 201, an inner diameter of the second through hole 202, and an inner diameter of the third through hole 203 are equal, so that the camera area 100 and the display area 200 are more easily adhered closely to each other.

The display panel 22 includes a first polarizer 221, an array substrate 222, a liquid crystal layer 223, a color filter substrate 224, and a second polarizer 225. The display panel 22 realizes a display function.

The first polarizer 221 is provided on an upper surface of the third film 213 and functions to polarize light. The array substrate 222 is disposed on an upper surface of the first polarizer 221 to serve as a circuit switch of the display device. The color filter substrate 224 is disposed above the array substrate 222 and opposite to the array substrate 222. The color filter substrate 224 includes RGB color resists, a black matrix, a spacer, a cover plate, and the like. The liquid crystal layer 223 is provided between the array substrate 222 and the color filter substrate 224. The second polarizer 225 is provided on an upper surface of the color filter substrate 224 and functions to polarize light.

The transparent area 14 penetrates the display panel 22 and is disposed corresponding to the through hole. The transparent area 14 includes a first transparent part 141, a second transparent part 142, a third transparent part 143, a fourth transparent part 144, and a fifth transparent part 145. The first transparent part 141 penetrates the first polarizer 221. The first transparent part 141 still has a function of polarizing light, but it is made of a transparent material, which is convenient for light to pass through. The second transparent part 142 penetrates through the array substrate 222. The second transparent part 142 still has a function of controlling the circuit switch, but it is made of a transparent material, which is convenient for light to pass through. The third transparent part 143 penetrates through the liquid crystal layer 223. The third transparent part 143 still has a function of driving liquid crystal, but it is light-transmissive to facilitate light to pass through. The fourth transparent part 144 penetrates through the color filter substrate 224. The fourth transparent part 144 is still provided with a black matrix, a spacer, a cover plate, etc., but free of RGB color resists, and since the LED chips 13 are color LED chips, the light filtering function can still be achieved, and made of a material of extremely transparent, which is convenient for light to pass through. The fifth transparent part 145 penetrates through the second polarizer 225. The fifth transparent part 145 still has a function of polarizing light, but it is made of a transparent material to facilitate light to pass through.

The camera 11 is disposed in the through hole. As shown in FIG. 6, the camera 11 includes a flexible circuit board 111, a connector 112, a photosensitive chip 113, a filter element 114, a lens 115, a support pillar 116, a focus motor 117, and a camera lens 118.

The connector 112 is provided at one end of the flexible circuit board 111 and configured to transmit image data received by the flexible circuit board 111 to the outside.

The photosensitive chip 113 is provided on an upper surface of the flexible circuit board 111, and has a CCD or CMOS structure, configured to convert an optical signal transmitted from the lens 115 into an electrical signal, and process the electrical signal to obtain corresponding image data. Alternatively, the obtained corresponding image data can be further processed with the image data received by the flexible circuit board 111 and then transmitted to the outside through the connector 112.

The filter element 114 is disposed above the photosensitive chip 113 and is configured to filter excess infrared light and ultraviolet light.

The lens 115 is disposed above the filter element 114 for collecting and concentrating light, and may be composed of two or more plastic lenses or glass lenses.

The support pillar 116 is attached to an inner side wall of the through hole to play a supporting role. The support pillar 116 is provided on an upper surface of the flexible circuit board 111 and has a ring shape at the edge.

The focus motor 117 is disposed in the support pillar 116 and configured to adjust the position of the lens 115 to obtain a clear image, that is, focusing function.

The camera lens 118 is disposed above the lens 115 and is mounted to the support pillar 116 to protect the lens 115.

The light blocking film 12 is attached to an inner side wall of the through hole, and is disposed between the support pillar 116 and the optical film 21, so as to block or reflect light and prevent the light emitted from the LED light bar 23 from entering the camera 11. A light blocking coating or component can be disposed by attaching, spray-coating, screen printing, etc., or a light blocking iron frame can also be placed, which all can achieve the light blocking effect. A top view of the camera area 100 is shown in FIG. 8.

The LED chips 13 are mounted on an upper surface of the support pillar 116. Because the support pillar 116 is a ring-shaped support pillar, the LED chips 13 also surround the lens 118 and are evenly distributed on the support pillar 116. The brightness of the LED chips 13 can be individually adjusted. Also, the LED chips 13 can also be connected to a related control element such as the flexible circuit board 111 or the photosensitive element 113 through a lead, to realize the synchronous control of the LED chips 13 and the camera 11, that is, when the camera 11 is working, the LED chips 13 can be controlled to be powered off to realize the camera function; while when the camera 11 is turned off, the LED chip 13 can be controlled to be powered and start working, so that the camera area 100 can display normally, and a full screen is realized.

In this embodiment, the fifth transparent part 145 has no design of RGB color resists. As such, the transmittance of the fifth transparent part 15 will be greatly improved, and the overall light transmittance of the camera area 100 will also be greatly improved. The LED chips 13 are at least one of the red mini-LED 131, the green mini-LED 132, and the blue mini-LED 133. By increasing a driving frequency of the camera area 100, color display of the camera area 100 is realized in an FSC drive mode during display. Compared with the display device in Embodiment 2, the overall transmittance of the camera area 100 in the display device in this embodiment will be further improved, but in order to support the FSC drive mode, selection of liquid crystal of a panel and control of the drive circuit need to be adjusted accordingly.

The light guide element 15 covers the LED chips 13, the light guide element 15 is transparent, and the transparency is as high as 90% to 100%. The light guide element 15 may be an optical film sheet, an optical film layer, or diffused particles, etc., such that the light of the LED chips 13 around the camera 11 can be uniformly incident below the camera area 100, and the difference in backlight between the camera area 100 and the display area 200 can be reduced.

When the LED chip 13 is powered on, the camera area 100 is turned on to be in a backlight mode. At this time, a lighting device such as the photosensitive chip 113, etc. is in a non-operating state, that is, no lighting, and because the transparent area 14 of the camera area 100 is still provided with related devices such as the array substrate, the color filter substrate, and the liquid crystal layer, the function of light-emitting display can be realized, and the camera area 100 can display normally while the display area 200 is the normal display state, that is, a full-screen effect is achieved (referring to FIG. 1).

When the LED chip 13 is powered off, the camera area 100 turns off the backlight mode. At this time, a lighting device such as the photosensitive chip 113 etc. is in a working state, At this time, a lighting device such as the photosensitive chip 113, etc. is in a working state, that is, starts lighting. Liquid crystals (i.e., the third transparent part 143) corresponding to the camera area 100 are driven and adjusted to be fully transferred into a high-transmittance state by the LCD. With the high-transmittance design of the second transparent part 142 and the fourth transparent part 144, external light can enter the camera 11 corresponding to and under the camera area 100 through the display panel 22 to realize the lighting function. At this time, the display area 200 still normally displays. Since a light blocking film 12 is disposed between the camera 11 and the edge-lit optical film 21, the backlight of the display area 200 will not impact the normal lighting of the camera 11, and the camera 11 can work normally (referring to FIG. 2).

Technical effect of the display device described in this embodiment is that by setting the camera under the screen, the screen-to-body ratio of the display device can be further increased, wherein when the LED chips are powered off, the camera area is in a lighting state and can shoot normally, while when the LED chips are powered on, the camera area is in a display state, thereby increasing the area of the display area, while improving the user's experience. The addition of a layer of the light guide element enables the light of the LED chips 13 around the camera to be uniformly incident below the camera area 100, and reduces the difference in backlight between the camera area and the display area, further improving the display effect of the display device. The color LED chips improve the transmittance of the transparent area and further improve the overall light transmittance of the camera area.

In the above embodiments, the descriptions of each embodiment have their own emphasis. The parts that are not described in detail in an embodiment can be referred to the detailed descriptions in other embodiments above, which will not be repeated herein for brevity.

The display device provided in the embodiments of the present application have been described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:

1. A display device, comprising:
an optical film comprising a through hole;
a display panel disposed on a surface of one side of the optical film, wherein the display panel comprises a transparent area corresponding to the through hole;
a camera comprising a camera lens, wherein the camera is inserted into the through hole and faces the transparent area;
a plurality of light emitting diode (LED) chips evenly arranged around the camera lens, wherein the LED chips are disposed in the through hole and between the camera and the transparent area; and
a light blocking film disposed on an inner sidewall of the through hole, wherein the light blocking film covers the inner sidewall of a first end of the through hole away from the display panel;
wherein the camera comprises:
a flexible circuit board having an end connected to a connector;
a photosensitive chip disposed on a surface of one side of the flexible circuit board;
a filter element disposed on a surface of the photosensitive chip away from the flexible circuit board;
a lens disposed on a side of the filter element away from the photosensitive chip;
a support pillar attached to an inner sidewall of the through hole, surrounding the lens, and disposed on a surface of the flexible circuit board close to the lens; and
a focus motor disposed in the support pillar,
wherein the camera lens is disposed on a side of the lens away from the filter element and mounted to the support pillar; and
the LED chips mounted on a top of the support pillar.

2. The display device according to claim 1, wherein the display panel comprises:
an array substrate;
a color filter substrate disposed opposite to the array substrate;
a liquid crystal layer disposed between the array substrate and the color filter substrate;
a first polarizer disposed on a surface of the array substrate away from the color filter substrate; and
a second polarizer disposed on a surface of the color filter substrate away from the array substrate.

3. The display device according to claim 2, wherein the transparent area comprises:
a first transparent part located in the first polarizer;
a second transparent part located in the array substrate;
a third transparent part located in the liquid crystal layer;
a fourth transparent part located in the color filter substrate; and
a fifth transparent part located in the second polarizer,
wherein the first transparent part, the second transparent part, the third transparent part, the fourth transparent part, and the fifth transparent part are arranged corresponding to each other.

4. The display device of claim 1, wherein the optical film comprises:
a first film;
a second film disposed on a surface of one side of the first film; and
a third film disposed on a surface of the second film away from the first film.

5. The display device of claim 4, wherein the through hole comprises:
   a first through hole penetrating the first film;
   a second through hole penetrating the second film; and
   a third through hole penetrating the third film,
   wherein the first through hole, the second through hole, and the third through hole are arranged corresponding to each other.

6. The display device of claim 1, further comprising a light guide element covering the LED chips.

7. The display device of claim 1, wherein each of the LED chips is at least one of a red mini-LED, a green mini-LED, and a blue mini-LED.

8. The display device of claim 1, wherein the LED chips are electrically connected to the flexible circuit board.

* * * * *